US010396636B2

(12) United States Patent
Isogai

(10) Patent No.: US 10,396,636 B2
(45) Date of Patent: Aug. 27, 2019

(54) POWER CONVERTER AND ROTARY ELECTRIC MACHINE

(71) Applicant: DENSO CORPORATION, Kariya, Aichi-pref. (JP)

(72) Inventor: Nobuo Isogai, Kariya (JP)

(73) Assignee: DENSO CORPORATION, Kariya (JP)

( * ) Notice: Subject to any disclaimer, the term of this patent is extended or adjusted under 35 U.S.C. 154(b) by 255 days.

(21) Appl. No.: 15/383,985

(22) Filed: Dec. 19, 2016

(65) Prior Publication Data

US 2017/0179796 A1 Jun. 22, 2017

(30) Foreign Application Priority Data

Dec. 18, 2015 (JP) ................................. 2015-247935

(51) Int. Cl.
| | |
|---|---|
| *H02K 11/33* | (2016.01) |
| *H02K 5/04* | (2006.01) |
| *H02K 9/00* | (2006.01) |
| *H02K 9/02* | (2006.01) |
| *H02K 11/04* | (2016.01) |
| *H02K 5/22* | (2006.01) |

(52) U.S. Cl.
CPC .............. *H02K 11/33* (2016.01); *H02K 5/04* (2013.01); *H02K 9/005* (2013.01); *H02K 9/02* (2013.01); *H02K 11/048* (2013.01); *H02K 5/225* (2013.01)

(58) Field of Classification Search
None
See application file for complete search history.

(56) References Cited

U.S. PATENT DOCUMENTS

| | | | |
|---|---|---|---|
| 2002/0024324 A1 | 2/2002 | Yamamoto et al. | |
| 2014/0361648 A1 | 12/2014 | Shirakata et al. | |
| 2015/0056910 A1 | 2/2015 | Ikeda et al. | |
| 2016/0104658 A1* | 4/2016 | Bradfield ................. | H02K 9/06 310/58 |

* cited by examiner

Primary Examiner — Alex Torres-Rivera
Assistant Examiner — Henry E Lee, III
(74) Attorney, Agent, or Firm — Oliff PLC

(57) ABSTRACT

In a power converter, outer lead frames are drawn out from a semiconductor module and are bent to be separated from a cooler. Each of the outer leads has a terminal end. The terminal end of each outer lead frame projects from a virtual plane extending along a second surface of a housing. Connector leads each includes an inner portion disposed in the housing, and an outer portion drawn out from the housing and bent to be separated from the cooler. The outer portion of each connector lead has a terminal end. The terminal end of the outer portion of each connector lead projects from the virtual plane.

10 Claims, 10 Drawing Sheets

POWER CONVERTER AND ROTARY ELECTRIC MACHINE

CROSS REFERENCE TO RELATED APPLICATIONS

This application is based on and claims the benefit of priority from Japanese Patent Application 2015-247935 filed on Dec. 18, 2015, the disclosure of which is incorporated in its entirety herein by reference.

TECHNICAL FIELD

The present disclosure relates to power converters each including a housing and at least one semiconductor module installed in the housing, and also relates to rotary electric machines each including at least one of such power converters.

BACKGROUND

For example, Japanese Patent Publication No. 5774207 discloses a rotary electric machine equipped with a control apparatus having higher reliability and easier assembling works. The conventional rotary electric machine disclosed in the Patent Publication No. 5774207 includes a control apparatus that includes a power module assembly and a control circuit unit. The power module assembly is fixed to a case in which a rotor and a stator are installed, and includes a power converter for performing power conversion between windings of the stator and a direct-current (DC) power source disposed outside of the rotary electric machine. The control circuit unit is operative to control the power converter.

The power module assembly includes a power module including switching elements constituting the power converter, and a ring housing incorporating therein the power module. The power module assembly also includes a heatsink that is fixed to the housing, and is configured to cool the power module. The power module includes a first lead frame connected to first electrodes of the switching elements, and a second lead frame connected to second electrodes of the switching elements. The power module also includes a third lead frame connected to third electrodes of the switching elements.

The ring housing is comprised of a first opening and a second opening opposite to each other. The heatsink is fitted in the first opening. The ring housing also includes power connectors, and signal connectors. The power connectors are integrally molded to the housing, and the signal connectors are joined to the third lead frames to be electrically connected thereto.

SUMMARY

Unfortunately, manufacturing the rotary electric machine disclosed in the Patent Publication No. 5774207 requires that the third lead frames are joined to the signal connectors inside the housing. Tools for joining the third lead frames and the signal connectors, such as tools for welding the third lead frames and the signal connectors, need be inserted into the housing via the second opening. In order to prevent the insertion of the connecting tools from interfering with the periphery of the second opening of the housing, the housing needs to have the second opening with a larger area, resulting in upsizing of the housing. This may therefore result in upsizing of the rotary electric machine disclosed in the Patent Publication No. 5774207.

In view of the circumstances set forth above, one aspect of the present disclosure seeks to provide power converters and rotary electric machines, each of which is designed to solve the problem set forth above.

Specifically, an alternative aspect of the present disclosure aims to provide such power converters and such rotary electric machines, each of which has a smaller size.

According to a first exemplary aspect of the present disclosure, there is provided a power converter for performing power conversion between an external direct-current power source and a stator coil of a rotary electric machine. The power converter includes a housing having opposing first and second surfaces, and a semiconductor module including at least one semiconductor element and having a predetermined surface. The semiconductor module is disposed in the housing to face the first surface of the housing, and being configured to perform the power conversion. The power converter includes a cooler disposed to be directly or indirectly in surface contact with the predetermined surface of the semiconductor module. The power converter includes a plurality of outer lead frames drawn out from the semiconductor module and bent to be separated from the cooler. Each of the outer leads has a terminal end. The terminal end of each of the outer lead frames projects from a virtual plane extending along the second surface of the housing. The power converter includes a plurality of connector leads each including an inner portion disposed in the housing, and an outer portion drawn out from the housing and bent to be separated from the cooler. The outer portion of each of the connector leads has a terminal end. The terminal end of the outer portion of each of the connector leads projects from the virtual plane. The power converter includes a joint portion at which the terminal end of each of the outer leads is joined to the terminal end of the outer portion of the corresponding one of the connector leads. The power converter includes a cap member that extends from the second surface of the housing up to the cooler to cover the outer lead frames, the outer portions of the connector leads, and the joint portion. The power converter includes a resin filler filled in a space defined between the housing, the cooler, and the cap member.

In the power converter according to the first exemplary aspect, the terminal end of each of the outer lead frames projects from the virtual plane extending along the second surface of the housing, and the terminal end of the outer portion of each of the connector leads projects from the virtual plane. The terminal end of each of the outer leads is joined to the terminal end of the outer portion of the corresponding one of the connector leads. That is, the connection between the terminal end of each of the outer leads and the terminal end of the outer portion of the corresponding one of the connector leads is located outside the housing. This eliminates the need to ensure an opening having a larger area through the housing, resulting in the power converter having a shorter length in the extending direction of each of the outer lead frames and the connector leads. This enables the power converter to have a smaller size.

In the power converter according to a second exemplary aspect of the present disclosure, the semiconductor module includes a resin molded package in which the at least one semiconductor element is molded. This contributes to the smaller size of the semiconductor module.

The semiconductor module of the power converter according to a third exemplary aspect of the present disclosure includes a cooled portion cooled by the cooler via the predetermined surface of the semiconductor module, and an inner lead frame disposed in the cooled portion and having a larger thickness than each of the outer lead frames. This configuration enables heat generated from the at least one semiconductor element of the semiconductor module to be efficiently transferred to the cooler via the inner lead frame.

In the power converter according to a fourth exemplary aspect of the present disclosure, the at least one semiconductor element includes at least one pair of first and second semiconductor elements connected in series to each other. The first semiconductor element of the at least one pair is an upper-arm switching element connected to a positive terminal of the direct-current power source. The second semiconductor element of the at least one pair is a lower-arm switching element connected to a negative terminal of the direct-current power source. This configuration enables the number of the inner lead frames and the outer lead frames to be reduced, resulting in downsizing of the semiconductor module.

In the power converter according to a fifth exemplary aspect of the present disclosure, the semiconductor modules has opposing surfaces different from the predetermined surface. The outer lead frames include a first set of outer lead frames drawn out from one of the opposing surfaces of the semiconductor module, and a second set of outer lead frames drawn out from the other of the opposing surfaces of the semiconductor module. This configuration enables the first set of the outer lead frames and the second set of the outer lead frames, which have a high potential difference, to be separated to the different opposing sides of the semiconductor module. This improves the reliability of the outer lead frames of the semiconductor module.

The power converter according to a sixth exemplary aspect of the present disclosure further includes an insulative member interposed between the predetermined surface of the semiconductor module and the cooler. The insulative member has a higher thermal conductivity than the resin filler. This configuration enables heat generated from the semiconductor module to be efficiently transferred to the cooler via the insulative adhesive, thus efficiently cooling the semiconductor module.

In the power converter according to a seventh exemplary aspect of the present disclosure, the cap member has a first end portion joined to the second surface of the housing, and a second end portion joined to the coolant. The first end of the cap member has a first fit portion at a tip thereof, and the second surface of the housing has a second fit portion formed therein. The first fit portion of the first end of the cap member is fitted in the second fit portion of the second surface of the housing.

This configuration enables the whole space of the cap member to have a labyrinth structure, thus more reliably preventing the resin filler filled in the whole space of the cap member from leaking out from the inside of the cap member.

In the power converter according to an eighth exemplary aspect of the present disclosure, the cap member serves as a part of the housing to support the semiconductor module. This configuration contributes to downsizing of the power converter.

According to a ninth exemplary aspect of the present disclosure, there is provided a rotary electric machine includes a rotor, a stator disposed to face the rotor, a frame that rotatably supports the rotor and supports the stator, and a power converter for performing power conversion between an external direct-current power source and a stator coil of the stator. The power converter includes a housing having opposing first and second surfaces, and a semiconductor module including at least one semiconductor element and having a predetermined surface. The semiconductor module is disposed in the housing to face the first surface of the housing, and is configured to perform the power conversion. The power converter includes a cooler disposed to be directly or indirectly in surface contact with the predetermined surface of the semiconductor module. The power converter includes a plurality of outer lead frames drawn out from the semiconductor module and bent to be separated from the cooler. Each of the outer leads has a terminal end, and the terminal end of each of the outer lead frames projects from a virtual plane extending along the second surface of the housing. The power converter includes a plurality of connector leads each including an inner portion disposed in the housing, and an outer portion drawn out from the housing and bent to be separated from the cooler. The outer portion of each of the connector leads has a terminal end, and the terminal end of the outer portion of each of the connector leads projects from the virtual plane. The power converter includes a joint portion at which the terminal end of each of the outer leads is joined to the terminal end of the outer portion of the corresponding one of the connector leads. The power converter includes a cap member that extends from the second surface of the housing up to the cooler to cover the outer lead frames, the outer portions of the connector leads, and the joint portion. The power converter includes a resin filler filled in a space defined between the housing, the cooler, and the cap member.

This configuration of the power converter according to the ninth exemplary aspect of the present disclosure results in downsizing of the power converter, resulting therefore in downsizing of the rotary electric machine.

In the rotary electric machine according to a tenth exemplary aspect of the present disclosure, the frame has an outer side surface to which the housing of the power converter is mounted. This configuration restricts heat generated from the stator from being transferred to the cooler.

Note that the claimed at least one semiconductor element includes a switching element, a diode, a transistor, an integrated circuit (IC), and a large-scale IC (LSI). A semiconductor element, which is configured to be switched on or off, can constitute the at least one switching element. For example, field-effect transistors (FETs), such as metal-oxide-semiconductor field-effect transistors (MOSFETs), junction gate field-effect transistors (JFETs), or metal-semiconductor field effect transistors (MSEFETs), insulated-gate bipolar transistors (IGBTs), gate turn-off thyristors (GTOs), or power transistors, can be used as switching elements. The claimed power converter can be freely designed as long as the power converter is capable of converting electrical power between the stator coil and the DC power source.

The claimed semiconductor module can include at least one semiconductor element, outer lead frames inner lead frames, a housing, and so on. The claimed housing can be made of any material and can be designed to have any shape as long as the semiconductor module, the outer lead frames, and the inner lead frames are mechanically associated to the housing. The claimed cooler can be designed as an air-cooling cooler or a fluid-cooling cooler. The claimed resin filler can be made of any insulative material. The claimed rotary electric machine can include various machines each including a rotating member, such as a shaft. For example, generators, motors, and motor-generators can be included in the claimed rotary electric machine; the motors include that a motor-generator serves as a motor, and the generators include that a motor-generator serves as a generator.

BRIEF DESCRIPTION OF THE DRAWINGS

Other aspects of the present disclosure will become apparent from the following description of an embodiment with reference to the accompanying drawings in which.

DETAILED DESCRIPTION OF EMBODIMENT

Figure 1:
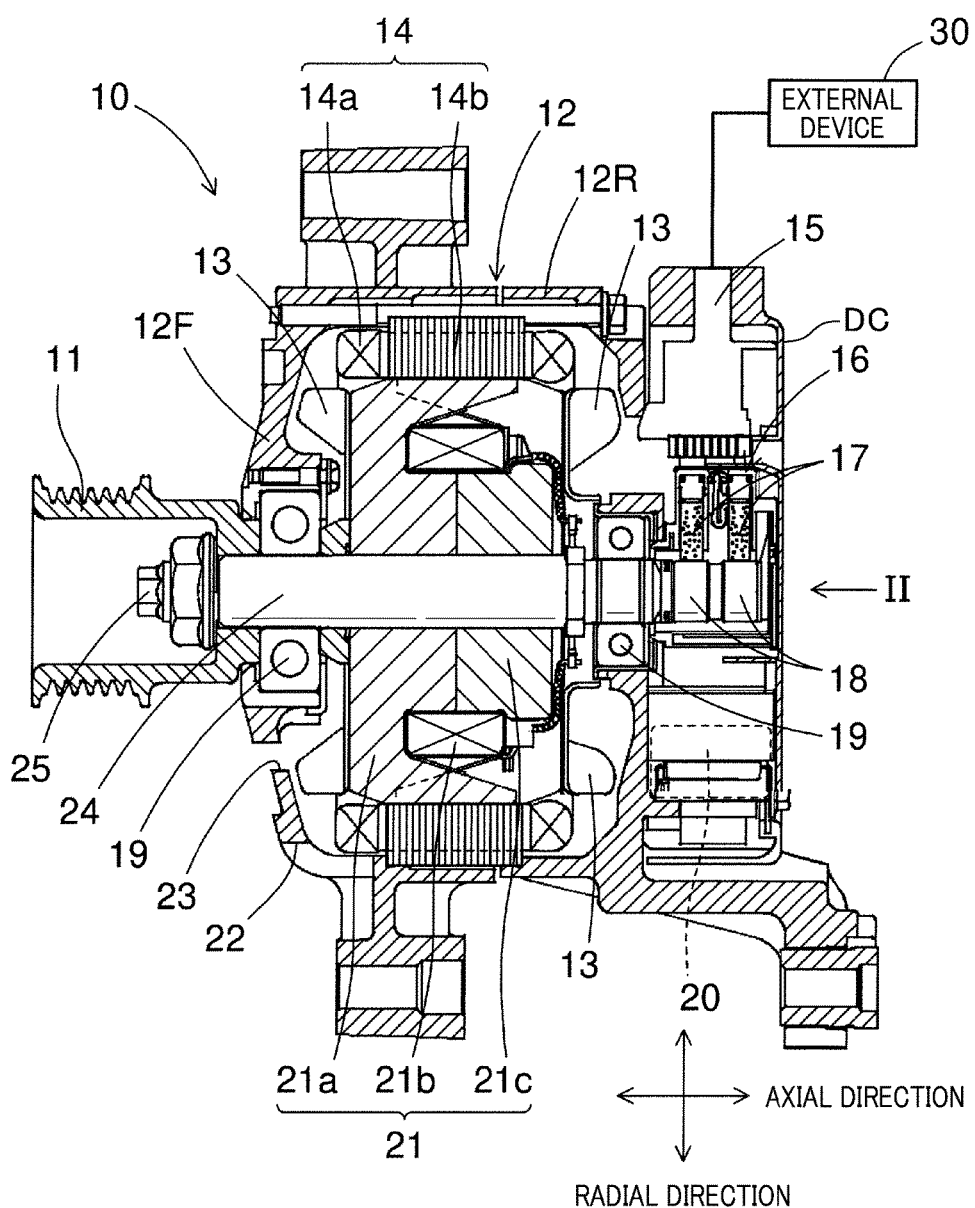
FIG. 1 is a partially cross sectional view schematically illustrating an example of the overall structure of a rotary electric machine according to the first embodiment of the present disclosure.

The following describes embodiments of the present disclosure with reference to the accompanying drawings. Hereinafter, the ter in "connection" represents electrical connection except that additional descriptions are added to the term "connection". Each drawing illustrates principal components required to describe part of the corresponding embodiment allocated for the drawing, and therefore does not necessarily illustrates all components of the part of the corresponding embodiment.

Directions including upper, lower, left, and right directions, are based on the descriptions in the drawings. Magnetic materials mainly represent soft magnetic materials, but can be made of any materials as long as magnetic flux can flow therethrough. Similarly, magnetic materials can have each have any structure as long as magnetic flux can flow therethrough.

The phrase A is fixed and/or mounted to B at least includes that (1) A is fastened to B with bolts or screws
(2) A and B are welded to each other
(3) A is adhered to B
(4) A is fixed or mounted to B based on combination of at least two of the methods (1) to (3)
(5) Other various expressions similar to these expressions (1) to (4).

First Embodiment

The following describes a rotary electric machine 10 according to the first embodiment of the present disclosure with reference to FIGS. 1 to 12.

The rotary electric machine 10 illustrated in FIG. 1 is designed as an inner-rotor rotary electric machine. Specifically, the rotary electric machine 10 includes a frame 12, a stator 14, a rotor 21, a rotary shaft 24 having axial first and second ends, and cooling fans 13; the stator 14, rotor 21, and cooling fans 13 are installed in the frame 12.

The frame 12 can have any shape allowing the stator 14, rotor 21, and cooling fans 13 to be installed therein. For example, the frame 12 illustrated in FIG. 1 has a hollow cylindrical shape, and is comprised of a hollow cylindrical front frame 12F and a follow cylindrical rear frame 12R continuously arranged in an axial direction of the frame 12.

The front frame 12F and rear frame 12R have center holes coaxially aligned. Part of the rotary shaft 24 is installed in the frame 12. The axial first and second ends of the rotary shaft 24 are penetrated from the center holes of the respective front and rear frames 12F and 12R. Bearings 19 are mounted on the respective center holes of the front and rear frames 12F and 12R, so that the rotary shaft 24 is rotatably supported by the bearings 19.

The frame 12 has a plurality of cooling-air discharge holes 22 and a plurality of cooling-air intake holes 23 formed therethrough. The frame 12 serves as both a bracket and a housing. Electronic components, such as coils, capacitors, or sensors, especially a rotational-angle measuring sensor, which are difficult to be installed in at least one power converter 20 described later, can be installed in the frame 12.

The frame 12 supports the stator 2 therein. The stator 2, which serves as an armature of the rotary electric machine 10, includes a stator core 14b and a stator coil 14a. The stator core 14b has, for example, a substantially annular shape, and is disposed in the frame 12 to be coaxial to the frame 12 and the rotary shaft 24. The stator core 14b is, for example, configured as a steel-sheet stack made of a plurality of magnetic steel sheets stacked on one another. This stack configuration of the stator core 14b arms to restrict the occurrence of eddy currents to reduce iron loss. The stator core 14b also has, for example, a plurality of slots formed therethrough. The slots are formed through the stator core 14b in its axial direction and are circumferentially arranged at given intervals.

The stator coil 14a is comprised of three or more phase windings wound through the slots of the stator core 14b.

The rotor 21 includes a pair of rotor cores 21a and 21c, and a rotor coil 21b. For example, each of the rotor cores 21a and 21c is made of a magnetic material, and has a predetermined configuration. For example, the rotor cores 21a and 21c are arranged in the stator 14 to face each other in the axial direction of the stator 14, and directly or indirectly mounted to the rotary shaft 34 in the rotor 21.

Like the stator core 14b, each of the rotor cores 21a and 21c is, for example, configured as a steel-sheet stack made of a plurality of magnetic steel sheets stacked on one another.

Figure 2:
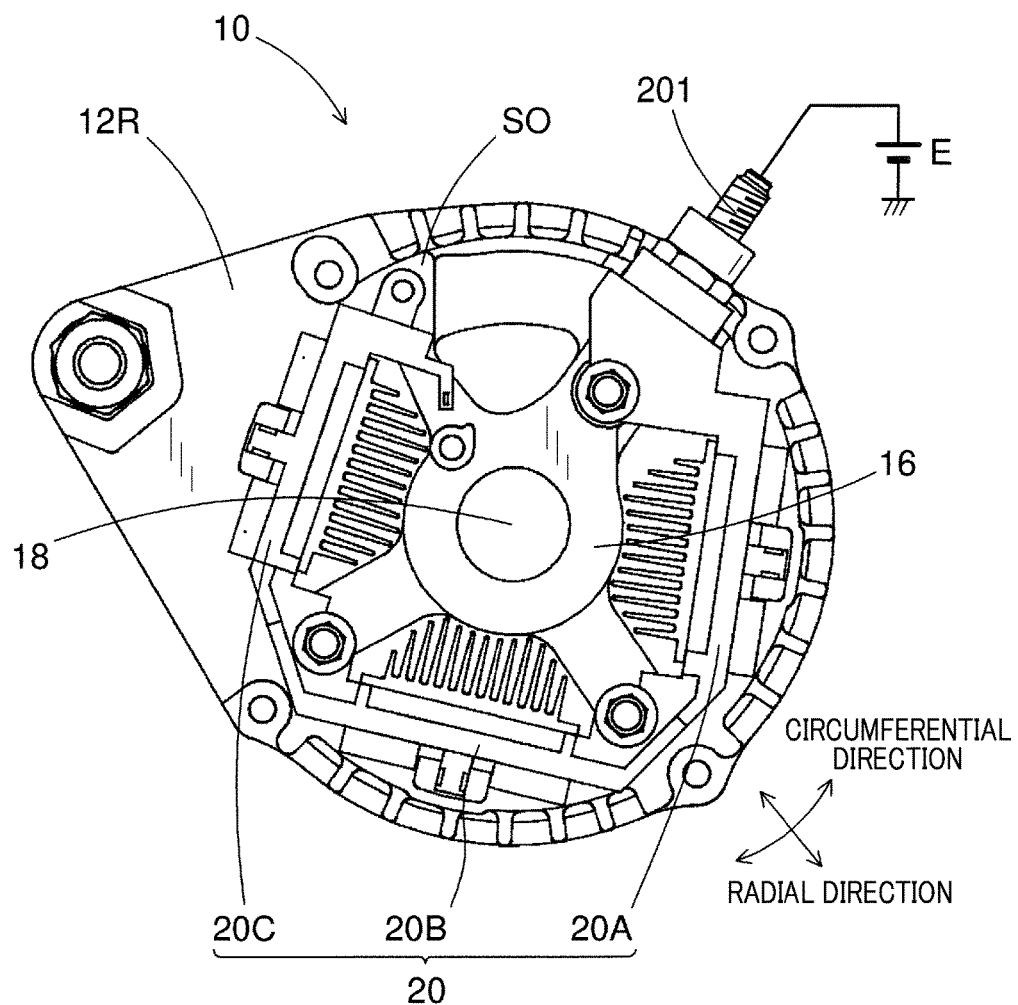
FIG. 2 is a plane view of the rotary electric machine illustrated in FIG. 1 when viewed from arrow II.

For example, each of the rotor cores 21a and 21c includes a circular base; the circular base can include an annular base, a circular plate-like base, or a hollow cylindrical shape. The circular base of the rotor core 21a and the circular base of the rotor core 21c are arranged to face each other. Each of the rotor cores 21a and 21c has a plurality of claw poles extending from the outer periphery of the axial end of the corresponding one of the circular bases toward the other thereof with predetermined pitches in the circumferential direction of the corresponding one of the circular bases. Note that the circumferential and radial directions of the rotary electric machine 10 are perpendicular to each other as illustrated in FIGS. 1 and 2

Each of the claw poles of each of the rotor cores 21a and 21c has a predetermined width and a predetermined thickness; the width of each claw pole of each of the rotor cores 21a and 21c is tapered toward the other of the rotor cores 21a and 21c.

That is, each of the plurality of claw poles extends from the outer periphery of the corresponding one of the circular base toward the other thereof so as to have a substantially L-shape cross section perpendicular the direction of its width. Each of the plurality of claw poles can have another cross-sectional shape, such as a J-shape or a U-shape.

The claw poles of one of the rotor cores 21a and 21c and the claw poles of the other of the rotor cores 21a and 21c are alternately arranged in the circumferential direction of the rotor cores 21a and 21c so that they engage in one another like fingers. As described above, each of the rotor cores 21a and 21c having the claw poles is made of at least a magnetic material.

The rotor coil 21b, which serves as a field winding, is coaxially disposed between the rotor cores 21a and 21b such that the claw poles wrap around the rotor coil 21b. When the rotor coil 21b is energized, the claw poles of the rotor core 21a are magnetized to have one of N and S poles, and the claw poles of the rotor core 21c are magnetized to have the other of N and S poles. This results in the N and S poles being alternately arranged in the circumferential direction of the rotor 21.

The rotor 21 is coaxially disposed inside the stator 14 with a predetermined radial air gap (clearance) with respect to the stator 14. The radial length of the air gap between the rotor 21 and the stator 14 can be freely set as long as the rotor 21 and stator 14 are prevented from contacting with each other, and magnetic flux can flow between the stator 14 and rotor 21.

Each of the cooling fans 13 serves as a cooler. The cooling fans 13 are mounted on respective axial end surfaces of the rotor 21 so as to be close to the stator coil 14a. When the cooling fans 36 are rotated together with the rotor 21, each cooling fan 36 works to suck cooling air from the outside of the frame 12 via the cooling-air intake holes 23, deliver the cooling air inside the frame 12, and discharge the delivered cooling air from the frame 12 through the cooling-air discharge holes 22. This cools the whole of the rotary electric machine 10 including a brush holder 16 described later, and the stator 14.

As described above, the rotary shaft 24 is rotated together with the rotor 21, because the rotor 21 is directly or indirectly mounted to the rotary shaft 24.

The rotary electric machine 10 includes a pulley 11, a brush holder 16 including brushes 17, slip rings 18, and at least one power converter 20.

The pulley 11 is mounted to the first end of the rotary shaft 24, which projects from the center hole of the front frame 12F with fastening members 25. The slip rings 18, each of which has an electrically conductive characteristic, are coaxially mounted on the second end of the rotary shaft 24. Both ends of an unillustrated transfer belt are respectively wound on the pulley 11 and a rotary shaft of a power source, such as an internal combustion engine when the rotary electric machine 10 is installed in a vehicle. This enables rotary power to be transferred between the rotary electric machine 10 and the internal combustion engine via the transfer belt.

The slip rings 18 are connected to the rotor coil 21b via lead wires. The slip rings 18 are contacted to the brushes, such as positive and negative brushes, 17 installed in the brush holder 16, and the brushes 17 are connected to the regulator 15 via terminals of the brush holder 16. The brush holder 16 has insulation performance.

The brush holder 16 has a through hole through which the second end of the rotary shaft 24 passes while the slip rings 18 are disposed in the brush holder 16. The brushes 17 installed in the brush holder 16 are pressed to contact with the respective slip rings 18.

The regulator 15, the brush holder 16 including the brushes 17, and the slip rings 18 are disposed around the second end of the rotary shaft 24 to face an outer end surface, i.e. an outer side surface, SO of the rear frame 12R in the axial direction of the frame 12. As described later, the at least one power converter 20 is mounted to the outer end surface SO of the rear frame 12R. These regulator 15, brush holder 16, slip rings 18, and the at least one power converter 20 are for example covered with a rear cover RC.

The regulator 15 is connected to an external device 30, and is operative to adjust a field current to be supplied to the rotor coil 21b based on information sent from the external device 30. The regulator 15 can include connectors that enable the external device 30 to be connected to the control terminals of switching elements, which are described later, of the at least one power converter 20. This enables the external device 30 to control the switching elements of the power converter assembly 30, making it possible for the external device 30 to control how the rotary electric machine 10 is rotated or operated. The regulator 15 can be connected to the at least one power converter 20 or cannot thereto.

The external device 30 is configured to control the regulator 15 to control the field current supplied to the rotor coil 21b accordingly, and to control the at least one power converter 20 to control an alternating current supplied to the stator coil 14a. This configuration controls how the rotary electric machine 10 is turned. This configuration also causes the stator coil 14a to generate alternating current (AC) power, and causes the at least one power converter 20 to convert the AC power into DC power, thus charging a direct-current (DC) power source E, which is connected to the at least one power converter 20, based on the DC power. The external device 30 includes a processor-based controller, such as a microcomputer or an electronic control unit (ECU). The external device 30 can be disposed outside the rotary electric machine 10 as illustrated in FIG. 1, or can be disposed inside the rotary electric machine 10 in the same manner as the at least one power converter 20 as illustrated in FIG. 2.

The DC power source E includes at least one battery, such as a fuel cell, a solar battery, a lithium-ion battery, or a lead acid battery. Fuel batteries and solar batteries are primary batteries capable of outputting DC power. Lithium-ion batteries and lead acid batteries are secondary batteries, i.e. DC-power rechargeable batteries. In particular, secondary batteries, such as lithium-ion batteries or lead acid batteries, are preferably used as the DC power source E, because the rotary electric machine 10 is capable of operating in a power running mode and a regenerative mode. The rotary electric machine 10 operating in the power running mode runs based on supplied power, and the rotary electric machine 10 operating in the regenerative mode generates power when decelerated.

As illustrated in FIG. 2, the at least one power converter 20 is mounted to the outer end surface SO of the rear frame 12R. The at least one power converter 20 is operative to perform power conversion between the DC power source E and at least one of the stator coil 14a and the rotor coil 21b of the rotary electric machine 10. Specifically, when the rotary electric machine 10 is running in the power running mode, the DC power source E supplies electrical power to the coils of the rotary electric machine 10 via the at least one power converter 20. In addition, when the rotary electric machine 10 is running in the regenerative mode, the DC power source E is charged based on electrical power supplied from the stator coil 14a via the at least one power converter 20.

As illustrated in FIG. 2, the at least one power converter 20 according to the first embodiment is comprised of three power converters, which are referred to as power converters 20A, 20B, and 20C, mounted to the outer end surface SO of the rear frame 12R to surround the brush holder 16. The power converters 20A, 20B, and 20C are communicably connected to each other. The power converters 20A, 20B, and 20C have a substantially identical shape except for a terminal portion 201 of the power converter 20A. The following therefore describes in detail the structure of the power converter 20A as a representative of the power converters 20A, 20B, and 20C.

Figure 3:
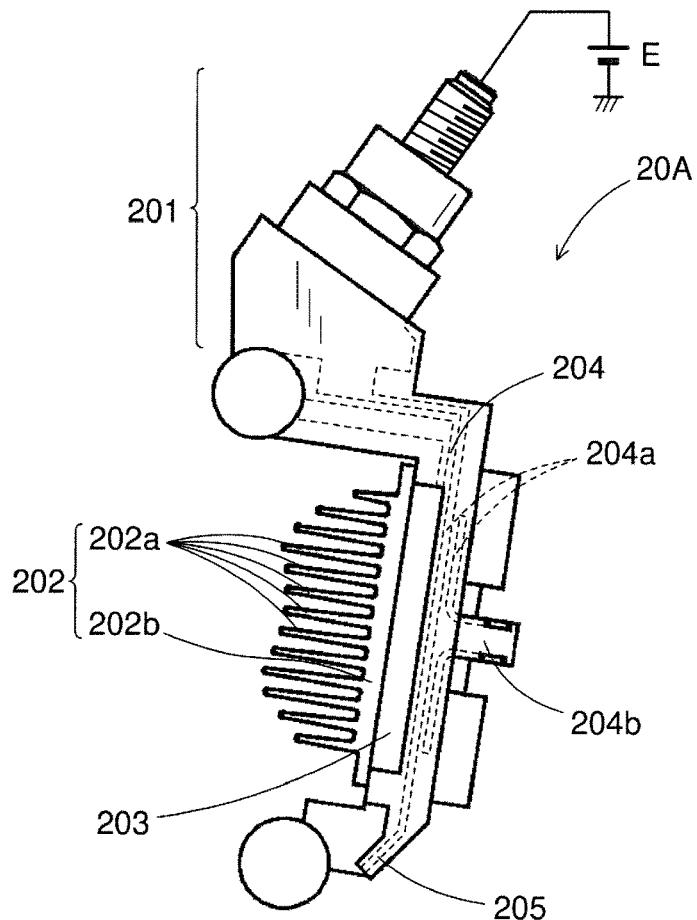
FIG. 3 is a plan view schematically illustrating an example of the outer appearance of a power converter of the rotary electric machine.

FIG. 3 schematically illustrates the outer appearance of the power converter 20A.

The power converter 20A illustrated in FIG. 3 for example includes a housing 204, terminal portions 201 and 205, a cooler 202, and a semiconductor module 203. For example, the housing 204 has a rectangular or square cuboid shape. For example, the terminal portion 201 is drawn to extend from, for example, one side of the housing 204. The terminal portion 201 serves as an output terminal to be connected to a vehicular harness. That is, the terminal portion 201 is connected to the semiconductor module 203, and also connected to the DC power source E via the vehicular harness. This enables electrical connection to be established between the semiconductor module 203 and the DC power source E. The terminal portion 205 also serves as an output terminal connected to the other power converters 20B and 20C. That is, the terminal portion 205 of the power converter 20A is connected to the semiconductor module 203, and also connected to the terminal portions 205 of the other power converters 20B and 20C. This enables electrical connection to be established between the semiconductor module 203 of the power converter 20A and the semiconductor modules 203 of the other power converters 20B and 20C.

The semiconductor module 203 includes one or more semiconductor elements, such as switching elements and/or diodes, and a substantially cuboid molded package 203a (see FIGS. 8 to 12 described later) having opposing first and second surfaces S2a and S2b. That is, the one or more semiconductor elements are molded to be packaged. The semiconductor module 203 is supported by the housing 204.

The cooler 202 includes, for example, a substantially cuboid body 202b having opposing first and second surfaces S3a and S3b, and a plurality of fins 202a projecting vertically from the first surface S3a of the body 202b. The cooler 202 is mounted at its second surface S3b on the first surface S2a of the semiconductor module 203 (molded package 203a) via an insulative adhesive 206 (see, for example, FIGS. 8 and 9).

Figure 4:
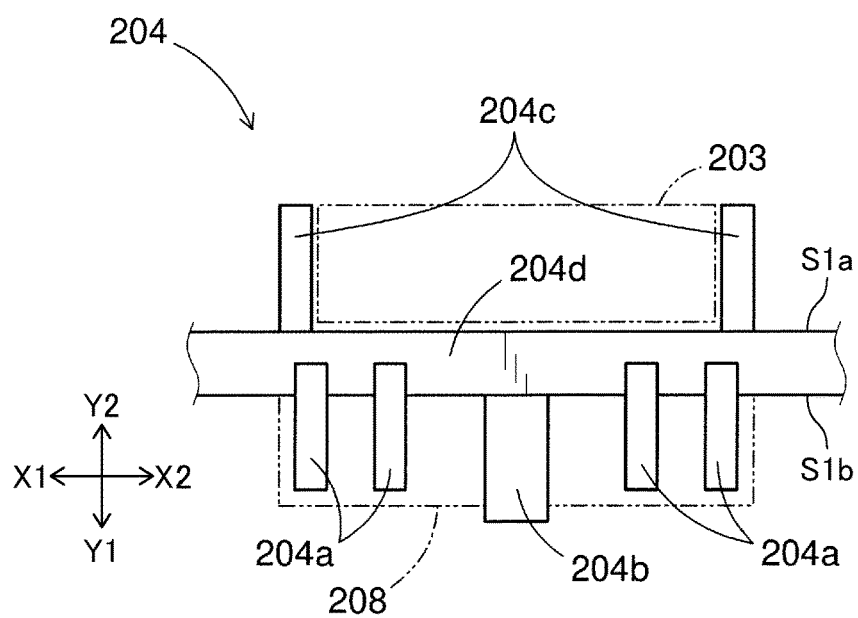
FIG. 4 is a schematic view schematically illustrating an example of the structure of a housing illustrated in FIG. 3.

As schematically illustrated in FIG. 4, the housing 204 includes, for example, a substantially cuboid body 204d, which is made of, for example, resin and has opposing first and second surfaces S1a and S1b. The housing 204 includes a plurality of connector leads 204a, at least one terminal portion 204b, and a plurality of sidewalls 204c. The body 204d has a predetermined length, a predetermined width, and a predetermined thickness; the length of the body 204d in first and second longitudinal directions X1 and X2 of the body 204d is longer than the width of the body 204d in first and second width directions Y1 and Y2 of the body 204d. Note that both the first and second longitudinal directions X1 and X2 and the first and second width directions Y1 and Y2 are along the external end surface SO of the rear frame 12R illustrated in FIG. 2.

Figure 8:
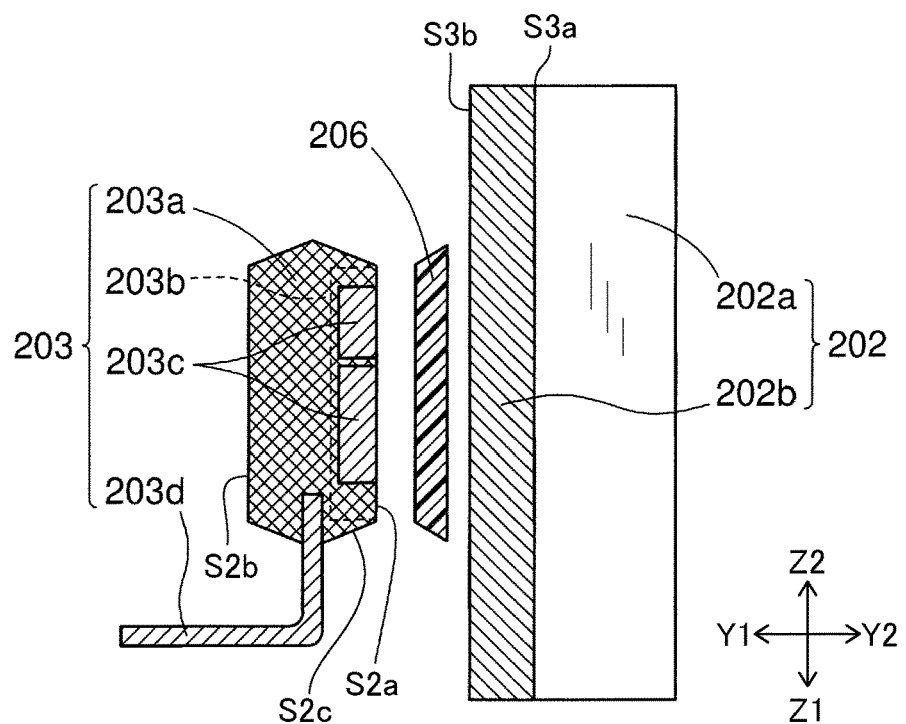
FIG. 8 is a partially cross sectional view schematically illustrating how the semiconductor module is joined to a cooler of the power converter.
Figure 9:
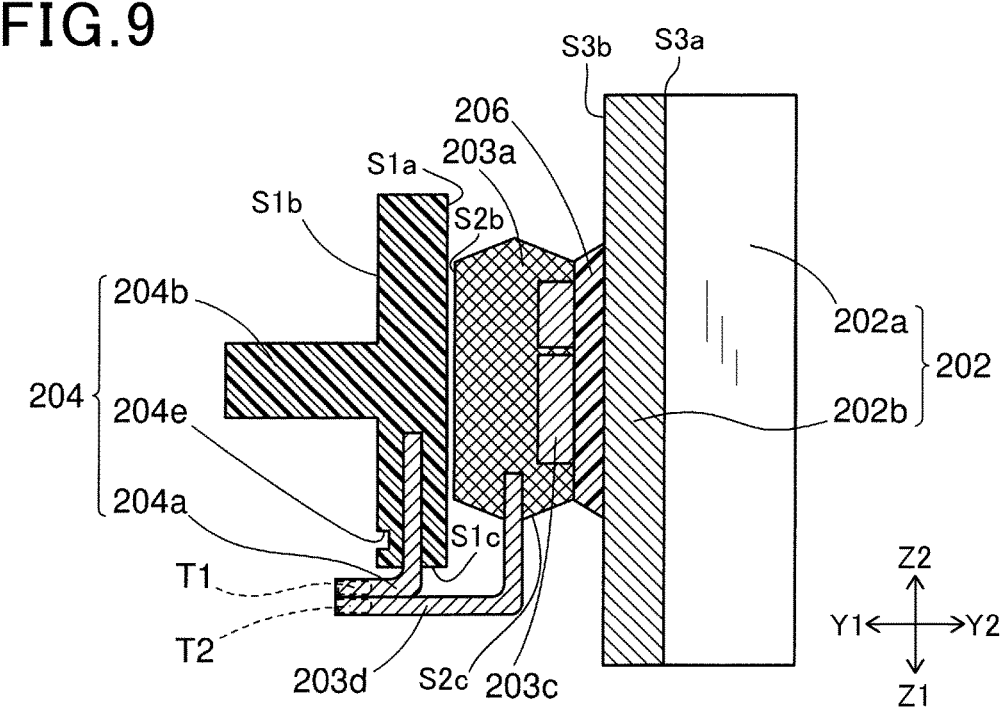
FIG. 9 is a partially cross sectional view schematically illustrating the situation where a terminal end of an outer portion of each of connector leads is in contact with a terminal end of the corresponding one of outer lead frames of the power converter.

Each of the connector leads 204a includes an inner portion embedded in the body 204d of the housing 204, and an outer portion drawn out from a side S1c of the body 204d in a first lateral direction Z1 of first and second lateral directions Z1 and Z2, and perpendicularly bent to extend in the first width direction Y1 (see FIG. 9). Note that, in each of FIGS. 8 to 12, the first and second lateral directions Z1 and Z2 of the body 204d, which cross the first and second width directions Y1 and Y2 and the first and second longitudinal directions X1 and X2, is defined.

The at least one terminal portion 204b is connected to the inner portions of the connector leads 204a, and projects outwardly from the body 204d in the first width direction Y1. As illustrated in FIG. 4, the projecting length of the at least one terminal portion 204b in the first and second width directions Y1 and Y2 can be longer or shorter than the projecting length of the outer portion of each connector lead 204a in the first and second width directions Y1 and Y2.

The plurality of sidewalls 204c project in the second side of the first and second width directions Y1 and Y2, and disposed to face each other with a predetermined space therebetween in the first and second longitudinal directions X1 and X2. The semiconductor module 203 is mounted on the first surface S1a of the body 204d between the sidewalls 204c in the first and second longitudinal directions X1 and X2 (see two-dot chain line in FIG. 4). Although eliminated in FIG. 4, the cooler 202 is mounted on or over the semiconductor module 203 and the sidewalls 204c in the first and second width directions Y1 and Y2.

Figure 5:
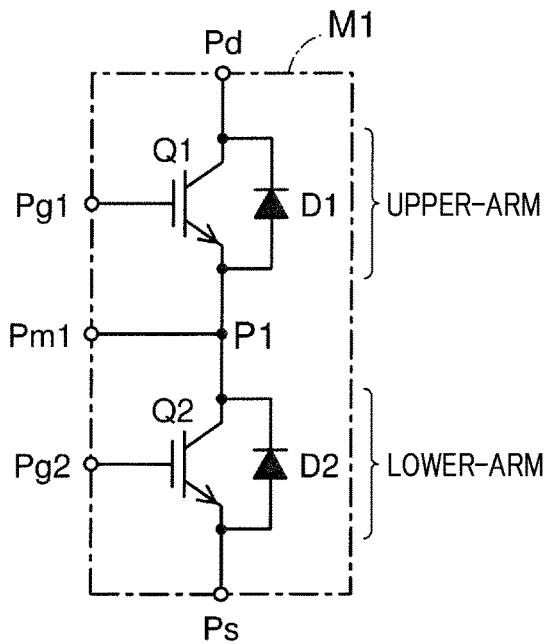
FIG. 5 is a circuit diagram schematically illustrating a first structural example of a semiconductor module illustrated in FIG. 3.
Figure 6:
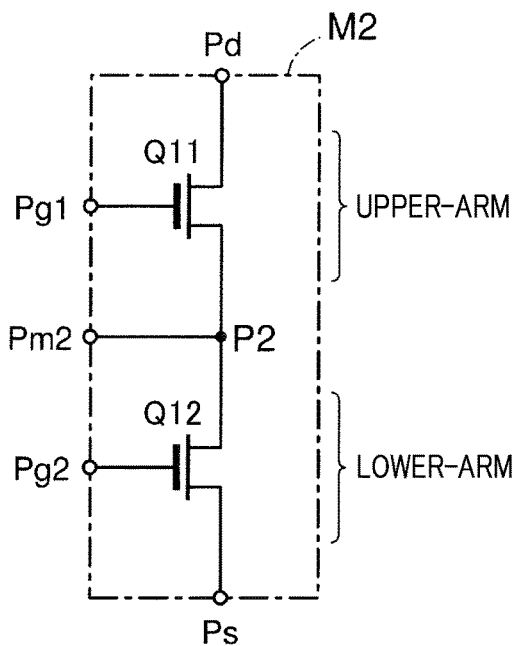
FIG. 6 is a circuit diagram schematically illustrating a second structural example of a semiconductor module illustrated in FIG. 3.
Figure 7:
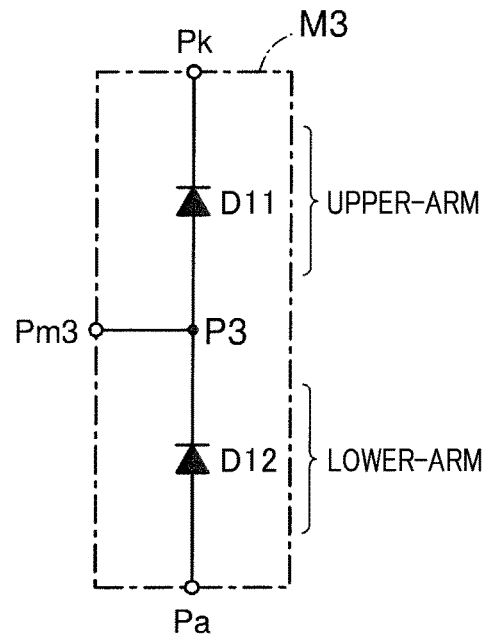
FIG. 7 is a circuit diagram schematically illustrating a third structural example of a semiconductor module illustrated in FIG. 3.

The following describes examples of the circuit included in the semiconductor module 203 with reference to FIGS. 5 to 7.

The semiconductor module 203 is comprised of at least one of a semiconductor module M1 illustrated in FIG. 5, a semiconductor module M2 illustrated in FIG. 6, and a semiconductor module M3 illustrated in FIG. 7.

Note that, although eliminated in each of FIGS. 5 to 7, the semiconductor module 203 includes inner lead frames 203c and outer lead frames 203d, which are illustrated in FIGS. 8 to 12, in addition to the corresponding one of the semiconductor modules M1, M2, and M3. Each of the inner lead frames 203c and outer lead frames 203d has, for example, a platy shape. How each of the semiconductor modules M1, M2, and M3 is implemented can be freely determined. For example, semiconductor elements can be mounted on a circuit board, and connected to one another with wires to implement each of the semiconductor modules M1, M2, and M3. A semiconductor chip can implement each of the semiconductor modules M1, M2, and M3.

The semiconductor module M1 illustrated in FIG. 5 includes switching elements Q1 and Q2, each of which is comprised of an insulated-gate bipolar transistor (IGBT), and flywheel diodes D1 and D2. The flywheel diode D1 is connected in parallel to the switching element Q1 such that the cathode of the flywheel diode D1 is connected to the collector of the switching element Q1. The flywheel diode D2 is connected in parallel to the switching element Q2 such that the cathode of the flywheel diode D2 is connected to the collector of the switching element Q2. The switching elements Q1 and Q2 are connected in series to each other. The set of the switching element Q1 and the flywheel diode D1 is connected to the positive terminal of the DC power source E, thus constituting an upper-arm element. The set of the switching element Q2 and the flywheel diode D2 is connected to the negative terminal of the DC power source E, thus constituting a lower-arm element.

The semiconductor module M1 has a connection terminal Pd connected to the input terminal, i.e. the collector, of the switching element Q1, and a connection terminal Pg1 connected to the control terminal, i.e. the gate, of the switching element Q1.

The semiconductor module M1 also has a connection terminal Ps connected to the output terminal, i.e. the emitter, of the switching element Q2, and a connection terminal Pg2 connected to the control terminal, i.e. the gate, of the switching element Q2.

The output terminal, i.e. the emitter, of the switching element Q1 and the input terminal i.e. the collector, of the switching element Q2 are connected to each other at the connection point P1. The semiconductor module M1 has a connection terminal Pm1 connected to the connection point P1 of the switching elements Q1 and Q2.

The connection terminals Pd, Pg1, Pg2, Ps, and Pm1 are connected to the inner lead frames 203c, or extend outside the molded package 203a of the semiconductor module 203 as some of the outer lead frames 203d.

The semiconductor module M2 illustrated in FIG. 6 includes switching elements Q11 and Q12, each of which is comprised of a metal-oxide-semiconductor field-effect transistor (MOSFET). Because each of the switching elements (MOSFETs) Q11 and Q12 includes an intrinsically has an intrinsic diode, the intrinsic diodes of the switching elements Q11 and Q12 serve as flywheel diodes, thus eliminating additional flywheel diodes like the diodes D1 and D2.

The switching elements Q11 and Q12 are connected in series to each other. The switching element Q11 is connected to the positive terminal of the DC power source E, thus constituting an upper-arm element. The switching element Q12 is connected to the negative terminal of the DC power source E, thus constituting a lower-arm element.

The semiconductor module M2 has a connection terminal Pd connected to the input terminal, i.e. the drain, of the switching element Q11, and a connection terminal Pg1 connected to the control terminal, i.e. the gate, of the switching element Q11.

The semiconductor module M2 also has a connection terminal Pg1 connected to the output terminal, i.e. the source, of the switching element Q12, and a connection terminal Pg2 connected to the control terminal, i.e. the gate, of the switching element Q12.

The output terminal, i.e. the source, of the switching element Q11 and the input terminal i.e. the drain, of the switching element Q12 are connected to each other at the connection point P2. The semiconductor module M2 has a connection terminal Pm2 connected to the connection point P2 of the switching elements Q11 and Q12.

The connection terminals Pd, Pg1, Pg2, Ps, and Pm2 are connected to the inner lead frames 203c, or extend outside the semiconductor module 203 as some of the outer lead frames 203d.

In place of the IGBTs of the semiconductor module M1 and/or the MOSFETs of the semiconductor module M2, junction gate field-effect transistors (JFETs), metal-semiconductor field effect transistors (MSEFETs), gate turn-off thyristors (GTOs), or power transistors can be used.

The semiconductor module M3 illustrated in FIG. 7 includes diodes D11 and D12. The semiconductor module M3 differs from the semiconductor module M1 in that no switching elements Q1 and Q2 are provided. The diodes D11 and D12 are connected in series to each other.

The semiconductor module M3 has a connection terminal Pk connected to the cathode of the diode D11, and a connection terminal Pa connected to the anode of the diode D12.

The anode of the diode D11 and the cathode of the diode D12 are connected to each other at the connection point P3. The semiconductor module M3 has a connection terminal Pm3 connected to the connection point P3 of the diodes D11 and D12.

The connection terminals Pk, Pa, and Pm3 are connected to the inner lead frames 203c, or extend outside the semiconductor module 203 as some of the outer lead frames 203d.

The following describes an example of the detailed structure of the semiconductor device 20 with reference to FIGS. 8 to 12. FIGS. 8 to 12 eliminate the illustration of the switching elements and/or diodes included in the semiconductor module 203.

For example, FIGS. 8 to 12 illustrate (1) How the semiconductor module 203 is joined to the cooler 202

(2) How a terminal end of each of the connector lead 204a is in contact with a terminal end of the corresponding one of the outer lead frame 203a (3) How the terminal end of each of the connector lead 204a is joined to the terminal end of the corresponding one of the outer lead frame 203a (4) How a cap member described later is mounted to the semiconductor device 20.

As described above, the insulative adhesive 206 is interposed between the first surface S2a of the semiconductor module 203 and the second surface S3b of the cooler 202 for surface contact between the semiconductor module 203 and the cooler 202. The insulative adhesive 206 has a higher thermal conductivity than a resin filler 209 described later and illustrated in FIG. 12.

The semiconductor module 203 includes a cooled portion 203b that is indirectly in surface contact with the cooler 202, so that the cooled portion 203b is cooled by the cooler 202 via the first surface S2a. The inner lead frames 203c, which are enclosed in the semiconductor module 203, are preferably disposed in the cooled portion 203b. Each of the inner lead frames 203c has a larger thickness than the outer lead frames 203d.

At least part of the inner lead frames 203c can be exposed from the molded package 203a in order to improve the cooling efficiency of the inner lead frames 203c.

Each of the outer lead frames 203d is drawn out from, for example, a side S2c of the molded package 203a in the first lateral direction Z1; the side S2c corresponds to the side S1c of the body 204d. Each of the outer lead frames 203d is bent to be separated from the cooler 202 in the first width direction Y1.

The outer portion of each of the connector leads 204a has the terminal end T1, and each of the outer lead frames 203d has the terminal end T2. As illustrated in FIG. 9, the terminal end T1 of the outer portion of each of the connector leads 204a is in contact with the terminal end T2 of the corresponding one of the outer lead frames 203d.

That is, the outer portion of each connector lead 204a is drawn out from the side S1c of the body 204d in the first lateral direction Z1, and is perpendicularly bent to extend in the first width direction Y1 so as to be separated from the cooler (see the left side of FIG. 9). Similarly, each outer lead frame 203d is drawn out from the side S2c of the molded package 203a in the first lateral direction Z1, and is bent to be separated from the cooler 202 in the first width direction Y1. This enables the terminal end T1 of the outer portion of each of the connector leads 204a to be in contact with the terminal end T2 of the corresponding one of the outer lead frames 203d.

Figure 10:
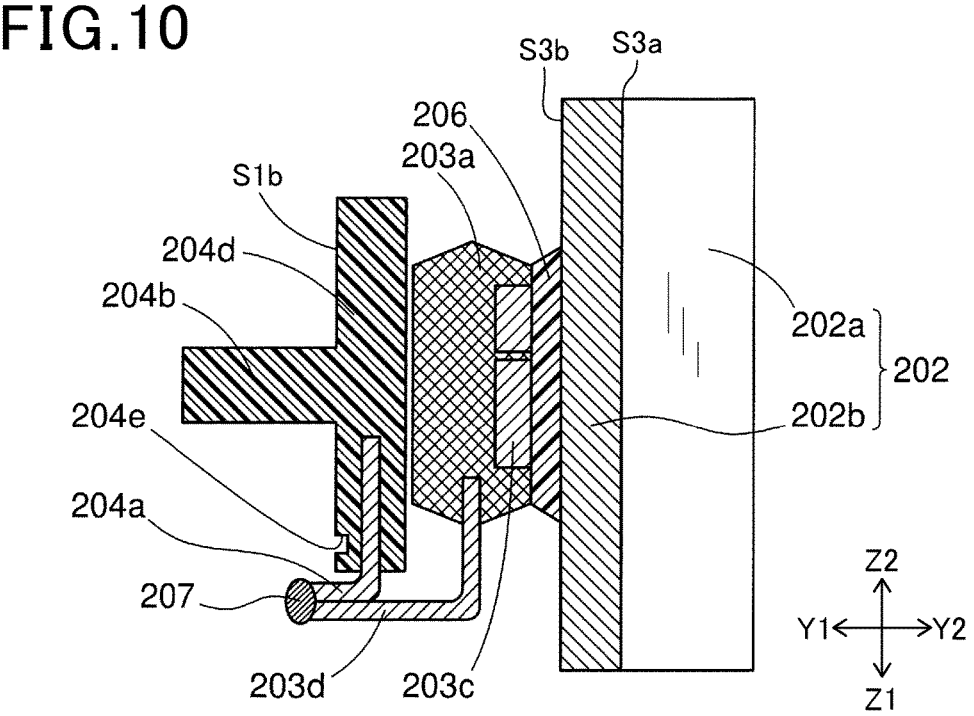
FIG. 10 is a partially cross sectional view schematically illustrating a joint portion at which the terminal end of the outer portion of each connector lead is joined to the terminal end of the corresponding one of outer lead frames of the power converter.

As illustrated in FIG. 10, the terminal end T1 of the outer portion of each of the connector leads 204a is electrically joined to the terminal end T2 of the corresponding one of the outer lead frames 203d. Reference numeral 207 represents the joint portion between the terminal end T1 of the outer portion of each of the connector leads 204a and the terminal end T2 of the corresponding one of the outer lead frames 203d. For example, the terminal end T1 of the outer portion of each of the connector leads 204a is welded or solder-mounted to the terminal end T2 of the corresponding one of the outer lead frames 203d.

The terminal end T1 of the outer portion of each of the connector leads 204a and the terminal end T2 of each of outer lead frames 203d are located outside the housing 204. This enables the joint work between the terminal end T1 of the outer portion of each of the connector leads 204a and the terminal end T2 of the corresponding one of the outer lead frames 203d to be easily performed.

As illustrated in FIG. 10, the terminal end T1 of the outer portion of each of the connector leads 204a and the terminal end T2 of each of outer lead frames 203d can be located to be close to the second surface S1b of the body 204d.

Figure 11:
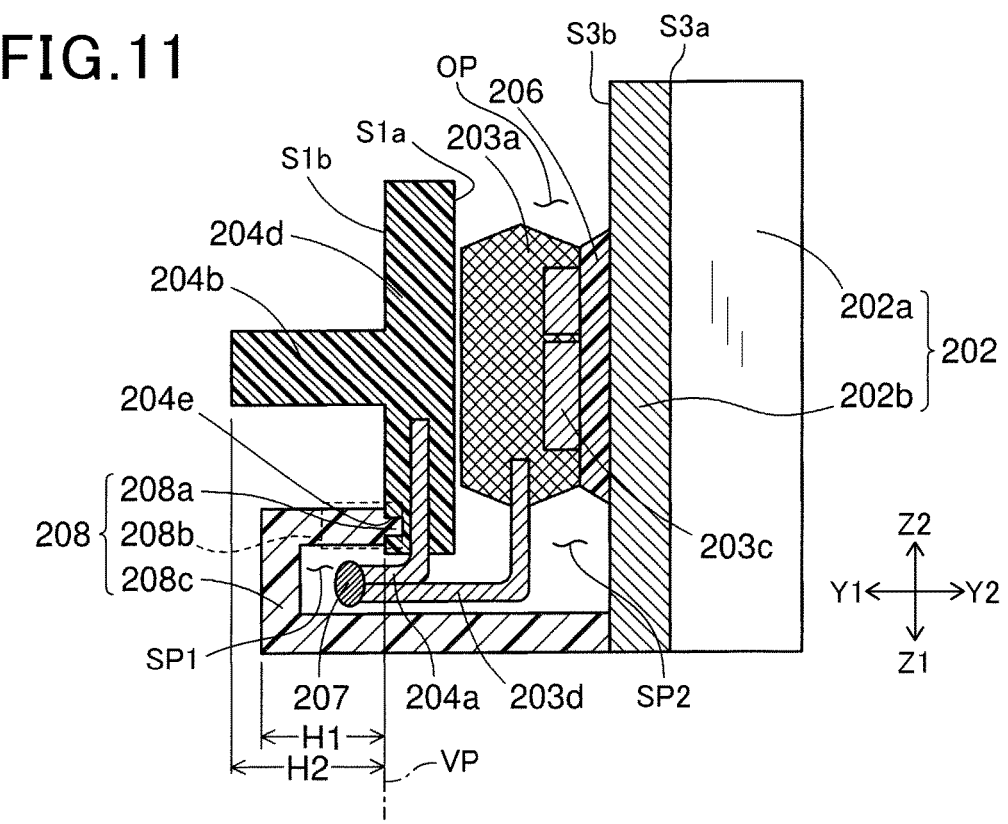
FIG. 11 is a partially cross sectional view schematically illustrating how a first end portion of a cap member is mounted to the second surface of the housing according to the first embodiment.

Referring to FIG. 11, the power converter 20 includes a cap member, i.e. a cover member, 208 that extends from the first end of the body 204d in the first lateral direction Z1 up to the second surface S1b of the body 204d to cover the connector leads 204a and the outer lead frames 203d, thus covering, i.e. protecting, the connector leads 204a, the outer lead frames 203d, and their joint portions 207. This results in a first space SP1 mainly formed between the cap member 208, the housing 204, and the cooler 202, and a second space SP2, which communicates with the first space SP1, mainly formed between the cooler 202, the semiconductor module 203, and the housing 204.

For example, the cap member 208 includes a body 208c having a substantially J-shaped cross section in the first and second width directions Y1 and Y2. The body 208c has a first end portion 208b joined to, for example, the second surface S1b of a first end of the body 204d of the housing 204 in the Z1 direction. The first end portion 208b of the body 208c has at its tip a first fit portion 208a fitted to a second fit portion 204e formed in the second surface S1b of the first end of the body 204d in the Z1 direction.

For example, the first fit portion 208a has a convex shape, and the second fit portion 204e has a concave shape in conformance with the convex shape, so that the first fit portion 208a is easily fitted in the second fit portion 204e. The cap member 208 can be made of resin.

The body 208c also has a second end portion 208d, opposite to the first end portion 207b. The surface of the second end 108d of the body 208c is joined to, for example, the second surface S3b of a first end of the body 202b of the cooler 202 in the Z1 direction. The surface of the second end 108d of the body 208c is preferably joined to the corresponding end of the second surface S3b of the body 202b of the cooler 202 with an adhesive (not shown). This prevents a resin filler 209 described later from leaking out from the inside of the cap member 208. The same material of the adhesive 206 set forth above can be used As the material of the adhesive used for joining the cap member 208 and the cooler 202, the same material as the material of the adhesive 206 or another material can be used.

As illustrated in FIG. 11, the joint portion 207 between the terminal end T1 of the outer portion of each of the connector leads 204a and the terminal end T2 of the corresponding one of the outer lead frames 203d is located to project from a virtual plane VP extending along the second surface S1b in the first lateral direction Z1. For this reason, the body 208c of the cap member 208 has a height H1 projecting with respect to the virtual plane VP in the first lateral direction Z1 longer than the height of the joint portion 207 projecting with respect to the virtual plane VP in the Z1 direction (see FIG. 11). The height H1 of the body 208c of the cap member 208 with respect to the virtual plane VP is preferably set to be shorter than the height H2 of the at least one terminal portion 204b with respect to the second surface S1b in the first lateral direction Z1. This setting prevents the cap member 208 from projecting outward relative to the at least one terminal portion 204b in the first lateral direction Z1, thus maintaining size of the power converter 20 being compact.

Figure 12:
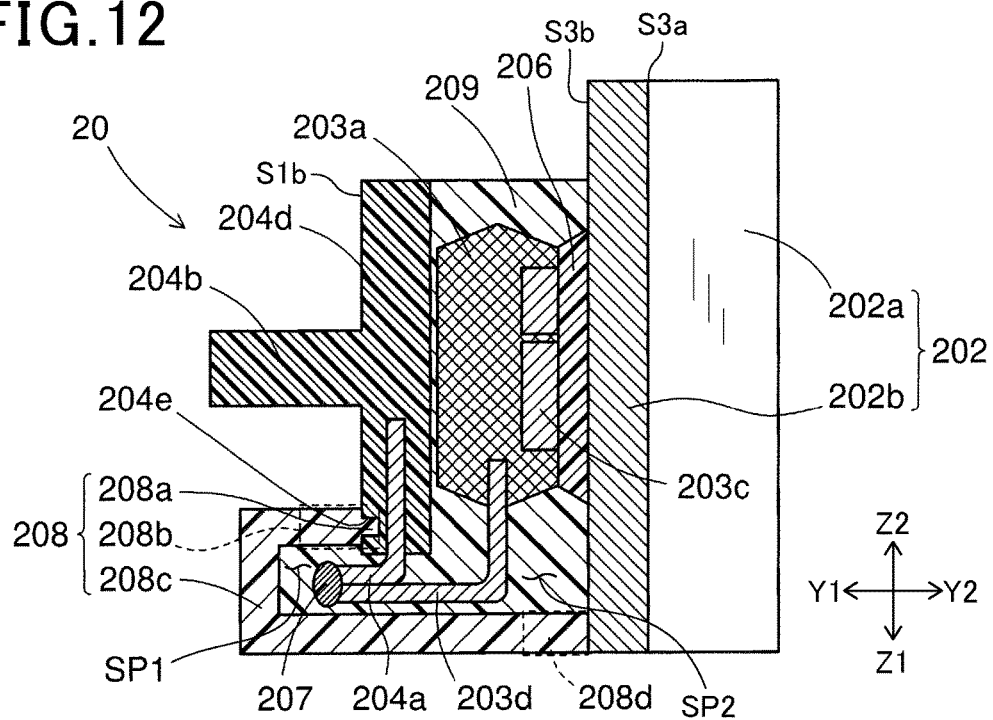
FIG. 12 is a partially cross sectional view schematically illustrating a structural example of the power converter.

Referring to FIG. 12, the power converter 20 includes a resin filler 209 filled in the first and second spaces SP1 and SP2 of the power converter 1. The resin filler 209 prevents water and/or dust particles from entering the inside of the housing 204. The resin filler 209 also dissipates heat, which is generated from the semiconductor module 203, through the cooler 202, housing 204, and cap member 208. For example, the resin filler 209, which has insulation performance, is inserted into the first and second spaces SP1 and SP2 via an opening OP; the opening OP is defined between a second end of the body 202b of the cooler 202 in the Z2 direction and a second end of the body 202b of the cooler 202 in the Z2 direction. The second end of the body 202b of the cooler 202 in the Z2 direction is opposite to the first end of the body 202b in the Z1 direction, and the second end of the body 202b of the cooler 202 in the Z2 direction is opposite to the first end of the body 202b of the cooler 202 in the Z1 direction.

The resin filler 209 can be made of a resin material that hardens after being filled in the first and second spaces SP1 and SP2, or a resin material that becomes viscous after being filled in the first and second spaces SP1 and SP2.

As described above, the first embodiment achieves the following advantageous effects.

The power converter 20, as illustrated in FIGS. 3 to 12, includes the cooler 202, the outer lead frames 203d, connector leads 204a, the joint portion 207, the cap member 208, and the resin filler 209.

The cooler 202 is indirectly contacted at the second surface S3b with the first surface S2a of the semiconductor module 203 to cool the semiconductor module 203. Each of the outer lead frames 203d is drawn out from the molded package 203a of the semiconductor device 203, and is bent to be separated from the cooler 202. Each of the connector leads 204a includes the inner portion disposed in the body 204d of the housing 204, and the outer portion drawn out from the body 204d and perpendicularly bent in the same direction as the outer lead frames 203d.

The joint portion 207 at which the terminal end T1 of the outer portion of each of the connector leads 204a is electrically joined to the terminal end T2 of the corresponding one of the outer lead frames 203d. The cap member 208 is configured to extend from the first end of the body 204d in the first lateral direction Z1 up to the second surface S1b of the body 204d to cover the connector leads 204a and the outer lead frames 203d, thus covering the connector leads 204a, the outer lead frames 203d, and their joint portions 207. The resin filler 209 is filled in both the first space SP1 mainly formed between the cap member 208 and the terminal ends T1 and T2, and the second space SP2 mainly formed between the cap member 208, the cooler 202, the semiconductor module 203, and the housing 204.

In particular, the terminal end T1 of the outer portion of each of the connector leads 204a and the terminal end T2 of the corresponding one of the outer lead frames 203d extend to project from the vertical plane VP along the second surface S1b of the housing 204; the second surface S1b is opposite to the first surface S2a of the semiconductor package 203. This eliminates the need to ensure the opening having a larger area through the housing 204, resulting in the power converter 20 having a shorter length in the extending direction of each of the outer lead frames 203d and the connector leads 204a in the first width direction Y1. This enables the power converter 20 to have a smaller size.

Additionally, as illustrated in FIGS. 5 to 12, the semiconductor module 203 includes one or more semiconductor elements (see FIGS. 5 to 7), and the substantially cuboid molded package 203a in which the one or more semiconductor elements are molded to be packaged. This contributes to the smaller size of the semiconductor module 203.

Referring to FIG. 8, the semiconductor module 203 includes the inner lead frames 203c disposed in the cooled portion 203b; the cooled portion 203b includes the first surface S2a and is cooled by the cooler 202. Each of the inner lead frames 203c has a larger thickness than the outer lead frames 203d. This configuration enables heat generated from the semiconductor elements, especially the switching elements, such as switching elements Q1, Q2, Q11, or Q12, of the semiconductor module 203 to be efficiently transferred to the cooler 202 via the inner lead frames 203c.

Referring to FIGS. 5 to 7, the semiconductor module 203 includes at least one pair of the upper-arm semiconductor element, such as the switching element Q1, switching element Q11, or the diode D11, and the lower-arm semiconductor element, such as the switching element Q2, switching element Q12, or the diode D12, connected in series to the upper-arm switching element. This configuration enables the number of the inner lead frames 203c and the outer lead frames 203a to be reduced, resulting in downsizing of the semiconductor module 203.

As illustrated in FIGS. 8 to 12, the power converter 20 includes the insulative adhesive 206 interposed between the first surface S2a of the semiconductor module 203 and the second surface S3b of the cooler 202; the insulative adhesive 206 has a higher thermal conductivity than the resin filler 209. This configuration enables heat generated from the semiconductor module 203 to be efficiently transferred to the cooler 202 via the insulative adhesive 206, thus efficiently cooling the semiconductor module 203.

The cap member 208 includes the body 208c, and the body 208c has the first end portion 208b joined to the second surface 1b of the first end of the second surface S1b of the body 204d of the housing 204 in the Z1 direction. The first end portion 208b of the body 208c has at its tip the first fit portion 208a fitted to the second fit portion 204e formed in the second surface S1b of the first end of the body 204d in the Z1 direction. This configuration enables the whole space of the cap member 208 to have a labyrinth structure, thus more reliably preventing the resin filler 209 filled in the whole space of the cap member 208 from leaking out from the inside of the cap member 208.

Like the sidewalls 204c illustrated in FIG. 4, the cap member 208 is configured to serve as a part of the housing 204 to support the semiconductor module 203 as illustrated in FIG. 12. This configuration contributes to downsizing of the power converter 20.

Referring to FIG. 1, the rotary electric machine 10 includes the rotor 21, the stator 14 disposed to face the rotor 21, the frame 12 that rotatably supports the rotor 21 and supports the stator 14, and the power converter 20. The power converter 20 having a lower size enables the rotary electric machine 10 to have a lower size.

As illustrated in FIG. 2, the housing 204 of the power converter 20 is mounted to the outer end surface SO of the frame 12. This configuration restricts heat generated from the stator 14 from being transferred to the cooler 202.

Second Embodiment

Figure 13:
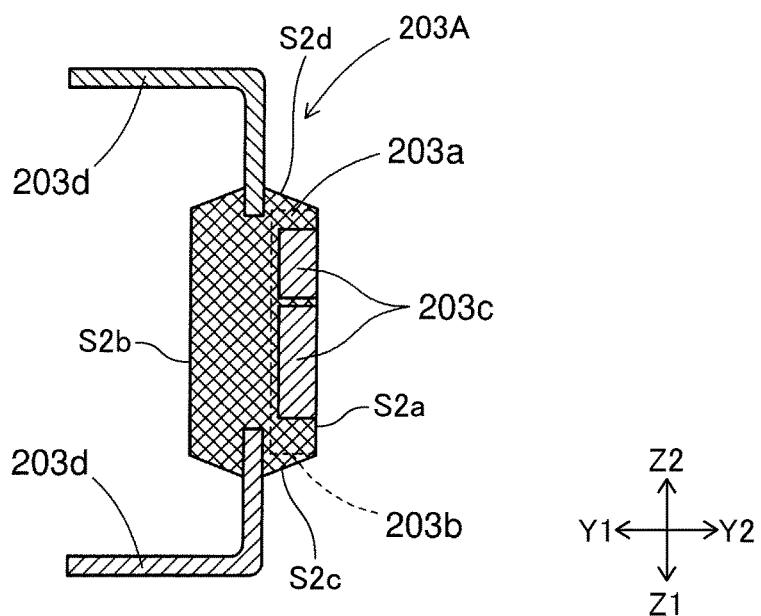
FIG. 13 is a cross sectional view schematically illustrating a semiconductor module of a power converter according to the second embodiment of the present disclosure; the semiconductor module includes a first set of outer lead frames drawn out from one of opposing sides of the semiconductor module, and a second set of outer lead frames drawn out from the other thereof.
Figure 14:
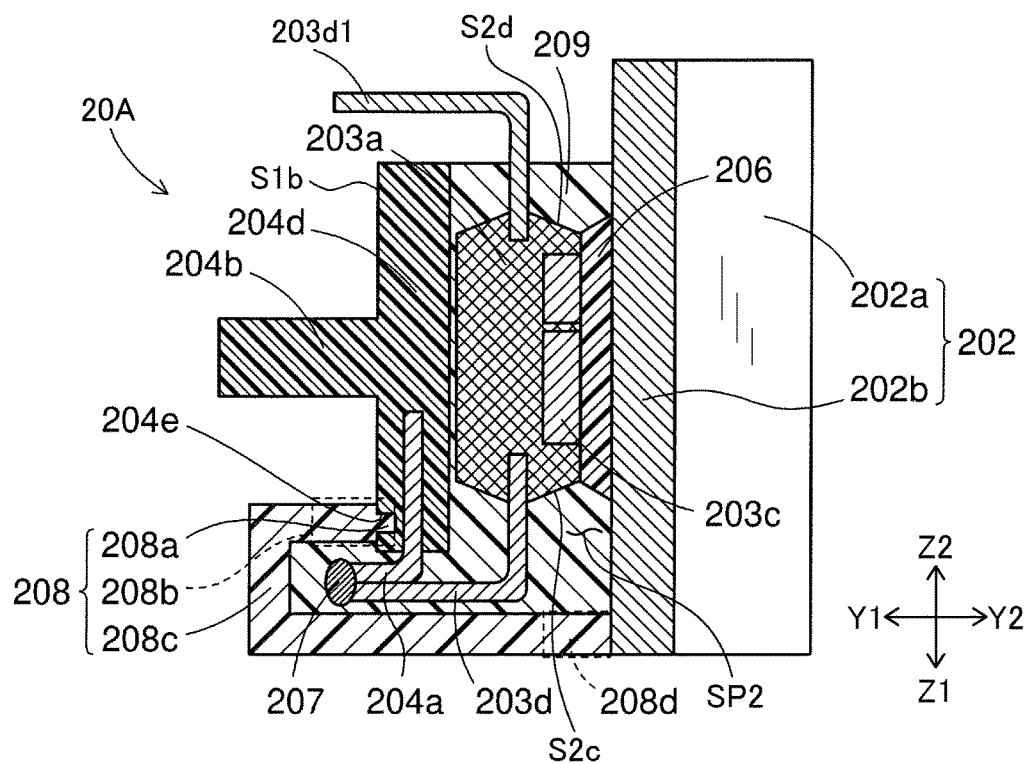
FIG. 14 is a structural example of the power converter according to the second embodiment.
Figure 15:
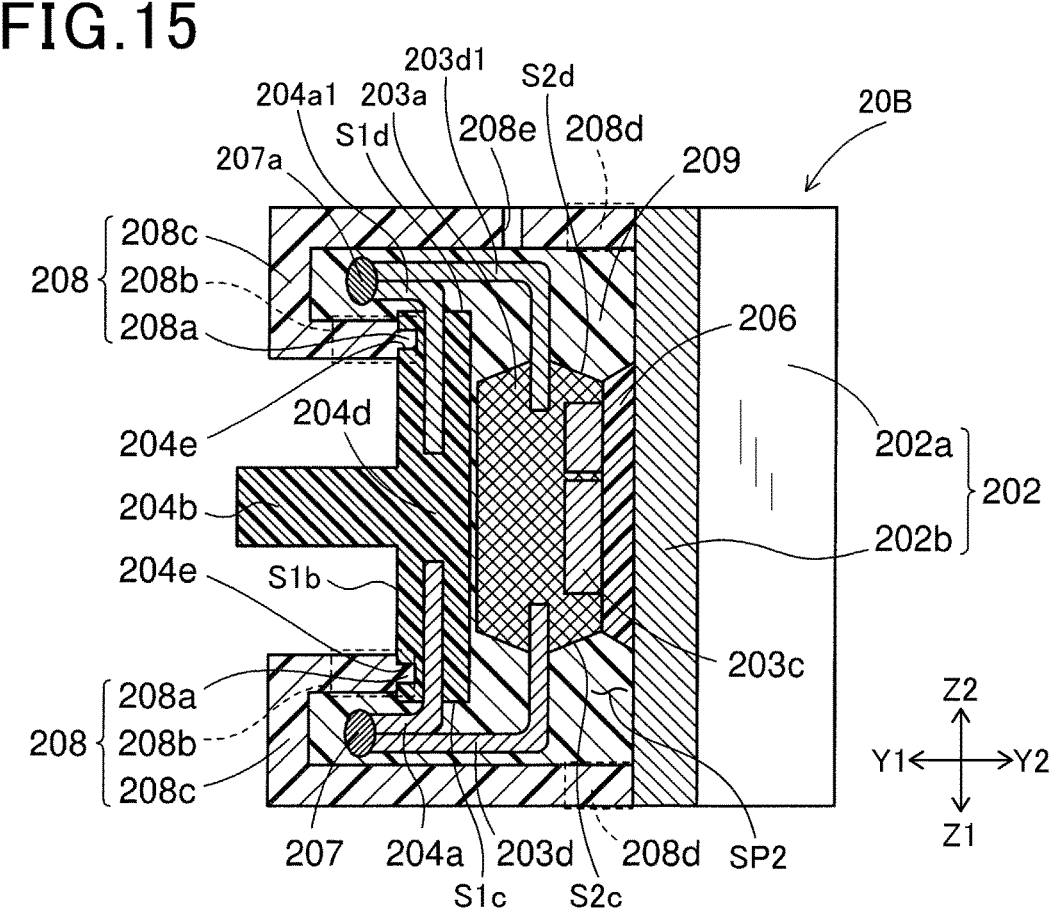
FIG. 15 is a modified structural example of the power converter according to the second embodiment.

The following describes a power converter 20A of a rotary electric machine according to the second embodiment of the present disclosure with reference to FIGS. 13 to 15. The structures and/or functions of the power converter 20A and the rotary electric machine according to the second embodiment are different from those of the power converter 20 and the rotary electric machine 10 according to the first embodiment mainly by the following points. So, the following mainly describes the different points, and omits or simplifies descriptions of like parts between the first and second embodiments, to which identical or like reference characters are assigned, thus eliminating redundant descriptions.

The power converter 20A includes a semiconductor module 203A. The semiconductor module 203A includes, in addition to the structure of the semiconductor module 203, outer lead frames 203d1 drawn out from a side S2d of the molded package 203a, which is opposite to the side S2c, in the first lateral direction Z1. Each of the outer lead frames 203d1 is bent to be separated from the cooler 202 in the first width direction Y1.

For example, the outer lead frames 203d1, which are located at the upper side of FIG. 14, are used for higher voltage transfer, such as transfer of several hundred volts. The outer lead frames 203d, which are located at the lower side of FIG. 14, are used for lower voltage transfer, such as transfer of several volts to several dozen volts. This configuration enables the differences in potential between the outer lead frames 203d and the differences in potential between the outer lead frames 203d1 to be reduced, thus preventing the occurrence of short-circuits among the outer lead frames 203d and among the outer lead frames 203d1.

The power converter 20A using the semiconductor module 203A is configured as illustrated in FIG. 14. The outer lead frames 203d1 serve as some of the connection terminals of the semiconductor module 203A.

As illustrated in FIG. 14, the power converter 20A includes a specific connection structure at the side of the first lateral direction Z 1. Specifically, the outer lead frames 203d are drawn out from the side S2c of the molded package 203a in the first lateral direction Z1, and the outer portion of each connector lead 204a is drawn out from the side S1c of the body 204d in the first lateral direction Z1. The terminal end T1 of the outer portion of each of the connector leads 204a is electrically joined to the terminal end T2 of the corresponding one of the outer lead frames 203d, so that the joint portion 207 is formed. The cap member 208 is configured to extend from the first end of the body 204d in the first lateral direction Z1 up to the second surface S1b of the body 204d to cover the connector leads 204a and the outer lead frames 203d, thus covering the connector leads 204a, the outer lead frames 203d, and their joint portions 207.

As a modification of the power converter 20A, a power converter 20B includes a second specific connection structure at the side of the second lateral direction Z2, which is substantially identical to the specific connection structure at the side of the second lateral direction Z2 (see FIG. 15).

Specifically, the outer lead frames 203d1 are drawn out from the side S2d of the molded package 203a in the second lateral direction Z2, and the outer portion of each connector lead 204a1 is drawn out from a side S1d, which is opposite to the side S1c, of the body 204d in the second lateral direction Z2. The terminal end T1 of the outer portion of each of the connector leads 204a1 is electrically joined to the terminal end T2 of the corresponding one of the outer lead frames 203d1, so that a joint portion 207A is formed. A cap member 208A is configured to extend from the second end of the body 204d in the second lateral direction Z2 up to the second surface S1b of the body 204d to cover the connector leads 204a1 and the outer lead frames 203d1, thus covering the connector leads 204a1, the outer lead frames 203d1, and their joint portions 207a. The resin filler 209 is therefore filled in the cap member 208A.

The semiconductor module 203A is completely installed in the housing 204 and the resin filler 209, making it possible to prevent the semiconductor module 203A from being exposed. The cap member 208A has at least one through hole 208e formed therethrough; the at least one through hole 208e is used to fill the resin filler 209 into the first and second spaces SP1 and SP2. An additional resin filler can be filled in the at least one through hole 208e after the resin filler 209 is completely filled in each of the cap members 208 and 208A, or an unillustrated stopper can be filled in the at least one through hole 208e after the resin filler 209 is completely filled in each of the cap members 208 and 208A.

As described above, the power converter 20A or 20B according to the second embodiment is configured such that the outer lead frames 203d and the outer lead frames 203d1 are drawn out from the respective sides S2c and S2d of the molded package 203a, which are opposite to each other. The power converter 20A or 20B according to the second embodiment can be configured such that the outer lead frames 203d and the outer lead frames 203d1 are drawn out from different sides of the molded package 203a. These configurations enable the outer lead frames 203d and the outer lead frames 203d1, which have a high potential difference, to be separated to the different sides of the molded package 203a. This improves the reliability of the outer lead frames 203d and 203d1 of the semiconductor module 203A.

The first and second embodiments of the present disclosure have been described, but the present disclosure is not limited to them. In other words, various modifications can be carried out within the scope of the present disclosure.

As illustrated in FIGS. 11 and 15, each of the first and second embodiments is configured such that the first fit portion 208a has a convex shape, and the second fit portion 204e has a concave shape in conformance with the convex shape, so that the first fit portion 208a is easily fitted in the second fit portion 204e. However, the present disclosure is not limited to the configuration.

Specifically, the first fit portion 208a can have a concave shape, and the second fit portion 204e can have a convex shape in conformance with the concave shape. This also enables the first fit portion 208a to be easily fitted in the second fit portion 204e.

Figure 16:
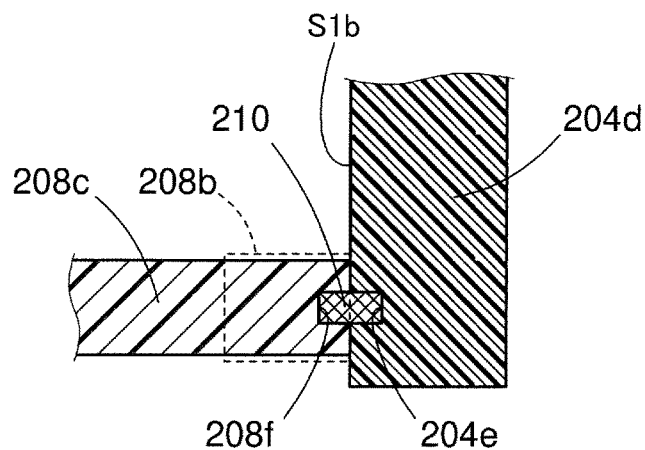
FIG. 16 is a partially cross sectional view schematically illustrating how the first end portion of the cap member is mounted to the second surface of the housing according to a modification of the first embodiment.

Additionally, as illustrated in FIG. 16, the first fit portion 208a can have a concave shape, and the second fit portion 204e can have an identical concave shape. In this modification, a bar-like or plate-like joint member 210 is prepared, each end of which is conformance with the concave shape. One end of the joint member 210 is fitted in the first fit portion 208a, and the other end of the joint member 210 is fitted in the second fit portion 204e, thus fixedly joining the first end portion 208b of the body 208c to the second surface S1b of the first end of the second surface S1b of the body 204d.

Figure 17:
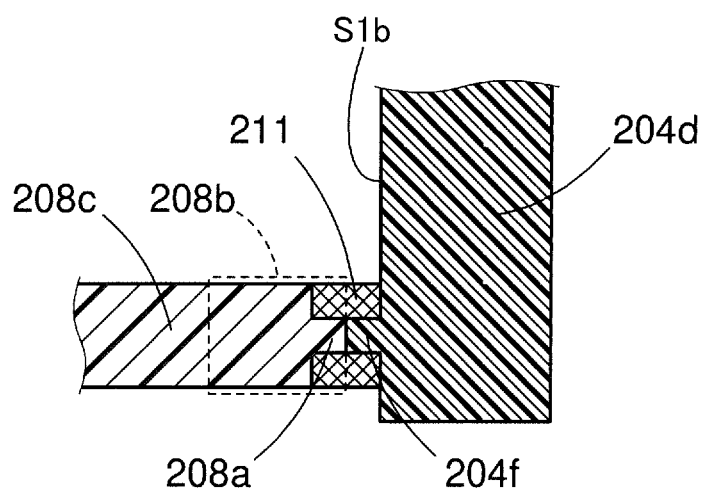
FIG. 17 is a partially cross sectional view schematically illustrating how the first end portion of the cap member is mounted to the second surface of the housing according to another modification of the first embodiment.

Moreover, as illustrated in FIG. 17, the first fit portion 208a can have a convex shape, and the second fit portion 204e can have an identical convex shape. In this modification, a tubular joint member 211 is prepared; the inner cylindrical space of the tubular joint member 211 is in conformance with the convexed first fit portion 208a and the convexed second fit portion 204e. One of the convexed first fit portion 208a and the convexed second fit portion 204e is fitted in the inner cylindrical space of the tubular joint member 211 from one axial side, the other of the convexed first fit portion 208a and the convexed second fit portion 204e is fitted in the inner cylindrical space of the tubular joint member 211 from the other axial side, thus fixedly joining the first end portion 208b of the body 208c to the second surface S1b of the first end of the second surface S1b of the body 204d.

These modifications illustrated in FIGS. 16 and 17 achieve the advantageous effects identical to the advantageous effects identical achieved by the first embodiment or the second embodiment, because the above differences between these modifications and each embodiment are within the scope of the present disclosure.

Each of the first and second embodiments is configured such that the three power converters 20A, 20B, and 20C are mounted to the outer end surface SO of the rear frame 12R.

However, at least one of the power converters 20A, 20B, and 20C except for all the power converters can be mounted to the outer end surface SO of the rear frame 12R. This modification achieves the advantageous effects identical to the advantageous effects identical achieved by the first embodiment or the second embodiment, because the above difference between this modification and each embodiment are within the scope of the present disclosure.

As illustrated in FIGS. 5 to 7, each of the first and second embodiments is configured such that the semiconductor module 203 includes at least one of the semiconductor modules M1, M2, and M3, but can include any combination of the semiconductor modules M1, M2, and M3. For example, the semiconductor module 203 can include the combination of three semiconductor modules M1 if the rotary electric machine is a three-phase rotary electric machine, or the semiconductor module 203 can include the combination of three semiconductor modules M2 and three semiconductor modules M3. Each of the semiconductor modules M1, M2, and M3 can include electronic elements, such as coils, capacitors, resistors, and other similar elements. This modification achieves the advantageous effects identical to the advantageous effects identical achieved by the first embodiment or the second embodiment, because the above difference between this modification and each embodiment are within the scope of the present disclosure.

As illustrated in FIGS. 9 to 12, 14, and 15, each of the first and second embodiments is configured such that the cooler 202 is mounted at its second surface S3$b$ on the first surface S2$a$ of the semiconductor module 203 (molded package 203$a$) via the insulative adhesive 206. That is, the second surface S3$b$ of the cooler 202 is indirectly in contact with the first surface S2$a$ of the semiconductor module 203. However, the second surface S3$b$ of the cooler 202 can be directly in contact with the first surface S2$a$ of the semiconductor module 203. In this modification, the inner lead frames 203$c$ are preferably unexposed from the molded package 203$a$. This modification achieves the advantageous effects identical to the advantageous effects identical achieved by the first embodiment or the second embodiment, because the above difference between this modification and each embodiment are within the scope of the present disclosure.

As illustrated in FIG. 3, each of the first and second embodiments is configured such that the power converter 20 includes the air-cooling cooler 202 having the plurality of fins 202$a$, but the power converter can include fluid-cooling cooler. The fluid-cooling cooler includes a cooling-fluid inlet, cooling-fluid channels, and a cooling-fluid outlet. As the cooling-fluid, cooling water or cooling oil can be used. The cooling-fluid is circulated between the fluid-cooling cooler and, for example, a pump. The cooling-water enables the semiconductor module 203 to be cooled. This modification achieves the advantageous effects identical to the advantageous effects identical achieved by the first embodiment or the second embodiment, because the above difference between this modification and each embodiment are within the scope of the present disclosure.

As illustrated in FIG. 1, each of the first and second embodiments is configured such that the rotary electric machine 10 is designed as an inner-rotor rotary electric machine, but the rotary electric machine 10 can be designed as an outer-rotor rotary electric machine. The rotor 21 can include an integrated rotor core in place of the rotor cores 21$a$ and 21$c$ arranged to face each other.

The rotary electric machine 10 can include a magnetic field member for generating N and S poles that are alternately arranged in the circumferential direction of the rotor 21. This modification eliminates the need to install the brush holder 16 and the slip rings 18 in the rotary electric machine, because the need to energize the rotor coil 21$b$ is eliminated.

The frame 12 can be comprised of an integrated frame constructed by integrating the front frame 12F with the rear frame 12R. The frame 12 also can has formed therein a cooling-fluid inlet, cooling-fluid channels, and a cooling-fluid outlet, like the fluid-cooling cooler. Cooling the rotary electric machine 20 using the cooling-fluid and cooling the rotary electric machine 20 using the air-cooling cooler 22 enables the cooling efficiency of the rotary electric machine 20 to be improved.

As illustrated in FIG. 1, in each of the first and second embodiments, each of the stator core 14$b$ and the rotor cores 21$a$ and 21$b$ is configured as a steel-sheet stack made of a plurality of magnetic steel sheets stacked on one another. In addition, each of the rotor cores 21$a$ and 21$c$ includes a plurality of claw poles. However, the present disclosure is not limited to these configurations.

Specifically, at least one of the stator core 14$b$ and the rotor cores 21$a$ and 21$b$ can be made of a single magnetic material, or can be further comprised of at least one permanent magnet, or can be comprised of the combination of a magnetic material and a permanent magnet. If at least one of the stator core 14$b$ and the rotor cores 21$a$ and 21$b$ includes at least one permanent magnet, reluctance torque based on magnetic flux flowing through the poles and magnetic torque based on the at least one permanent magnet improve the torque performance of the rotary electric machine 10. If permanent magnets are used in place of the claw poles, it is possible to reduce the number of turns of the rotor coil 21$b$ or eliminate the rotor coil 21$b$. Reducing the number of turns of the rotor coil 21$b$ or eliminating the rotor coil 21$b$ enable the rotary electric machine 10 to be downsized. These modifications achieve the advantageous effects identical to the advantageous effects identical achieved by the first embodiment or the second embodiment, because the above difference between these modifications and each embodiment are within the scope of the present disclosure.

As illustrated in FIG. 1, in each of the first and second embodiments, the rotor 21 and the cooling fans 13 are separately mounted to the frame 12, but they can be integrated with each other, and the integrated assembly of the rotor 21 and cooling fans 13 can be mounted to the frame 12. This modification achieves the advantageous effects identical to the advantageous effects identical achieved by the first embodiment or the second embodiment, because the above difference between this modification and each embodiment are within the scope of the present disclosure.

While the illustrative embodiments of the present disclosure have been described herein, the present disclosure is not limited to the embodiment described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. A power converter for performing power conversion between an external direct-current power source and a stator coil of a rotary electric machine, the power converter comprising:

a housing having opposing first and second surfaces;
a semiconductor module including at least one semiconductor element and having a predetermined surface, the semiconductor module being disposed in the housing to face the first surface of the housing, and being configured to perform the power conversion;
a cooler disposed to be directly or indirectly in surface contact with the predetermined surface of the semiconductor module;
a plurality of outer lead frames that extend out from the semiconductor module and are bent to extend away from the cooler, each of the outer lead frames having a terminal end, the terminal end of each of the outer lead frames projecting through a virtual plane extending along the second surface of the housing;
a plurality of connector leads each including:
  an inner portion disposed in the housing; and
  an outer portion that extends out from the housing and is bent to extend away from the cooler, the outer portion of each of the connector leads having a terminal end, the terminal end of the outer portion of each of the connector leads projecting through the virtual plane;
a joint portion at which the terminal end of each of the outer lead frames is joined to the terminal end of the outer portion of a corresponding one of the connector leads;
a cap member that extends from the second surface of the housing to the cooler to cover the outer lead frames, the outer portions of the connector leads, and the joint portion; and
a resin filler filled in a space defined between the housing, the cooler, and the cap member.

2. The power converter according to claim 1, wherein the semiconductor module includes a resin molded package in which the at least one semiconductor element is molded.

3. The power converter according to claim 1, wherein the semiconductor module further comprises:
  a cooled portion cooled by the cooler via the predetermined surface of the semiconductor module; and
  an inner lead frame disposed in the cooled portion and having a larger thickness than each of the outer lead frames.

4. The power converter according to claim 1, wherein the at least one semiconductor element includes at least one pair of first and second semiconductor elements connected in series to each other,
  the first semiconductor element of the at least one pair being an upper-arm switching element connected to a positive terminal of the direct-current power source,
  the second semiconductor element of the at least one pair being a lower-arm switching element connected to a negative terminal of the direct-current power source.

5. The power converter according to claim 1, wherein:
the semiconductor modules has opposing surfaces different from the predetermined surface; and
the outer lead frames include:
  a first set of outer lead frames that extend out from a first one of the opposing surfaces of the semiconductor module; and
  a second set of outer lead frames that extend out from a second one of the opposing surfaces of the semiconductor module.

6. The power converter according to claim 1, further comprising:
an insulative member interposed between the predetermined surface of the semiconductor module and the cooler, the insulative member having a higher thermal conductivity than the resin filler.

7. The power converter according to claim 1, wherein:
the cap member has a first end portion joined to the second surface of the housing, and a second end portion joined to the cooler;
the first end portion of the cap member has a first fit portion at a tip thereof;
the second surface of the housing has a second fit portion formed therein; and
the first fit portion of the first end portion of the cap member is fitted in the second fit portion of the second surface of the housing.

8. The power converter according to claim 1, wherein:
the cap member serves as a part of the housing to support the semiconductor module.

9. A rotary electric machine comprising:
a rotor;
a stator disposed to face the rotor;
a frame that rotatably supports the rotor and supports the stator; and
a power converter for performing power conversion between an external direct-current power source and a stator coil of the stator, the power converter comprising:
a housing having opposing first and second surfaces;
a semiconductor module including at least one semiconductor element and having a predetermined surface, the semiconductor module being disposed in the housing to face the first surface of the housing, and being configured to perform the power conversion;
a cooler disposed to be directly or indirectly in surface contact with the predetermined surface of the semiconductor module;
a plurality of outer lead frames that extend out from the semiconductor module and are bent to extend away from the cooler, each of the outer lead frames having a terminal end, the terminal end of each of the outer lead frames projecting through a virtual plane extending along the second surface of the housing;
a plurality of connector leads each including:
  an inner portion disposed in the housing; and
  an outer portion that extends out from the housing and is bent to extend away from the cooler, the outer portion of each of the connector leads having a terminal end, the terminal end of the outer portion of each of the connector leads projecting through the virtual plane;
a joint portion at which the terminal end of each of the outer lead frames is joined to the terminal end of the outer portion of a corresponding one of the connector leads;
a cap member that extends from the second surface of the housing to the cooler to cover the outer lead frames, the outer portions of the connector leads, and the joint portion; and
a resin filler filled in a space defined between the housing, the cooler, and the cap member.

10. The rotary electric machine according to claim 9, wherein the frame has an outer side surface to which the housing of the power converter is mounted.

* * * * *